UNITED STATES PATENT OFFICE.

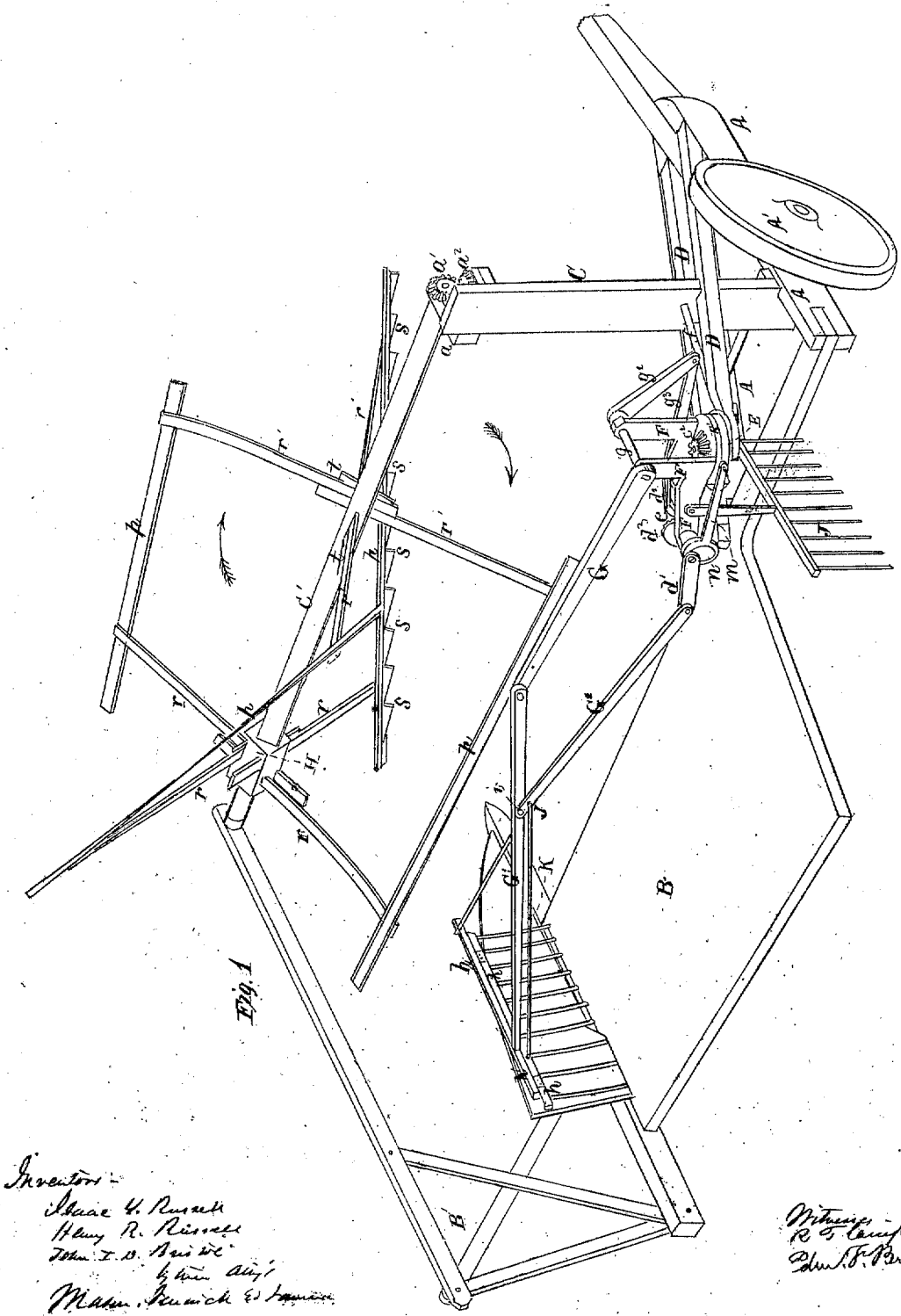

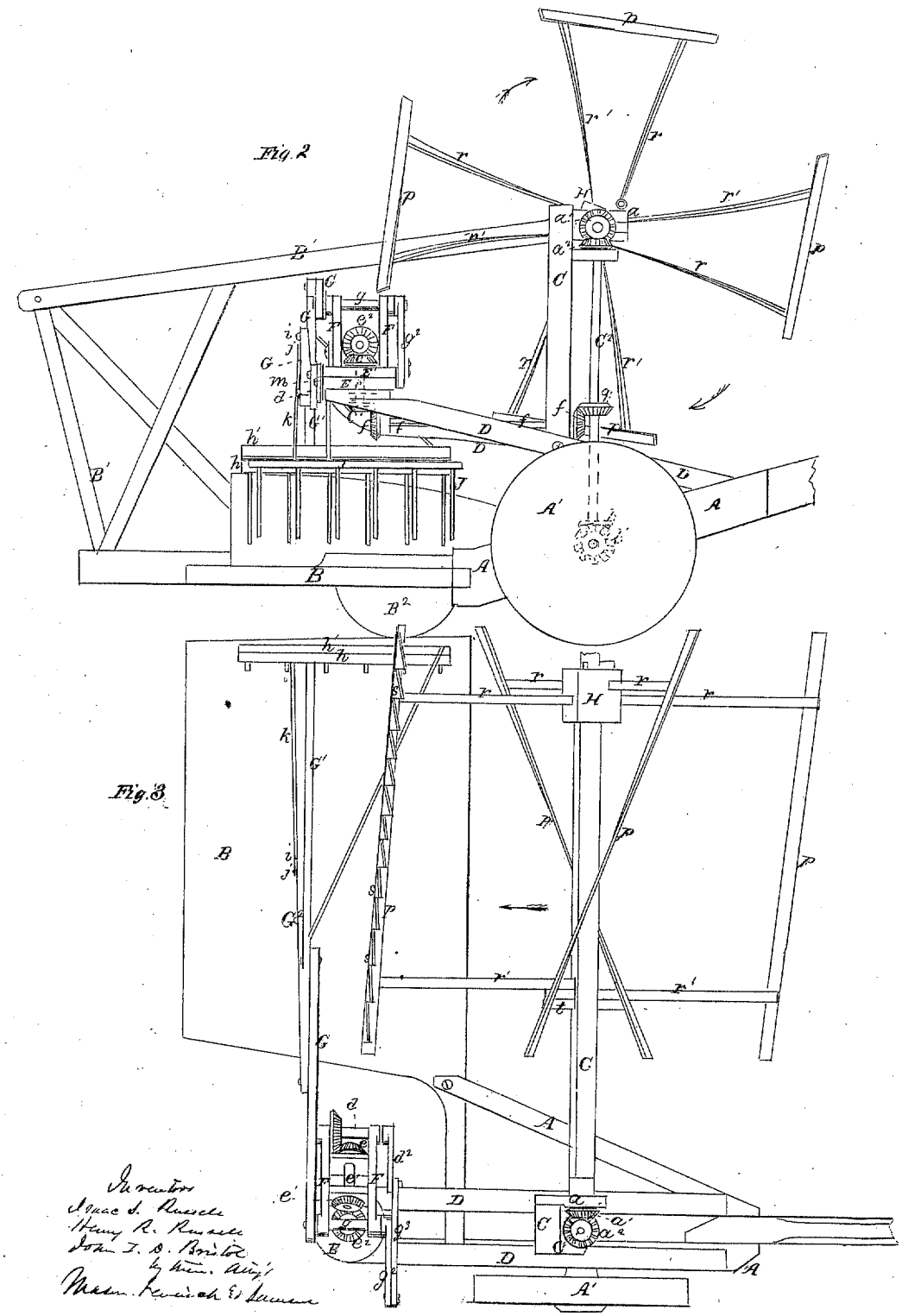

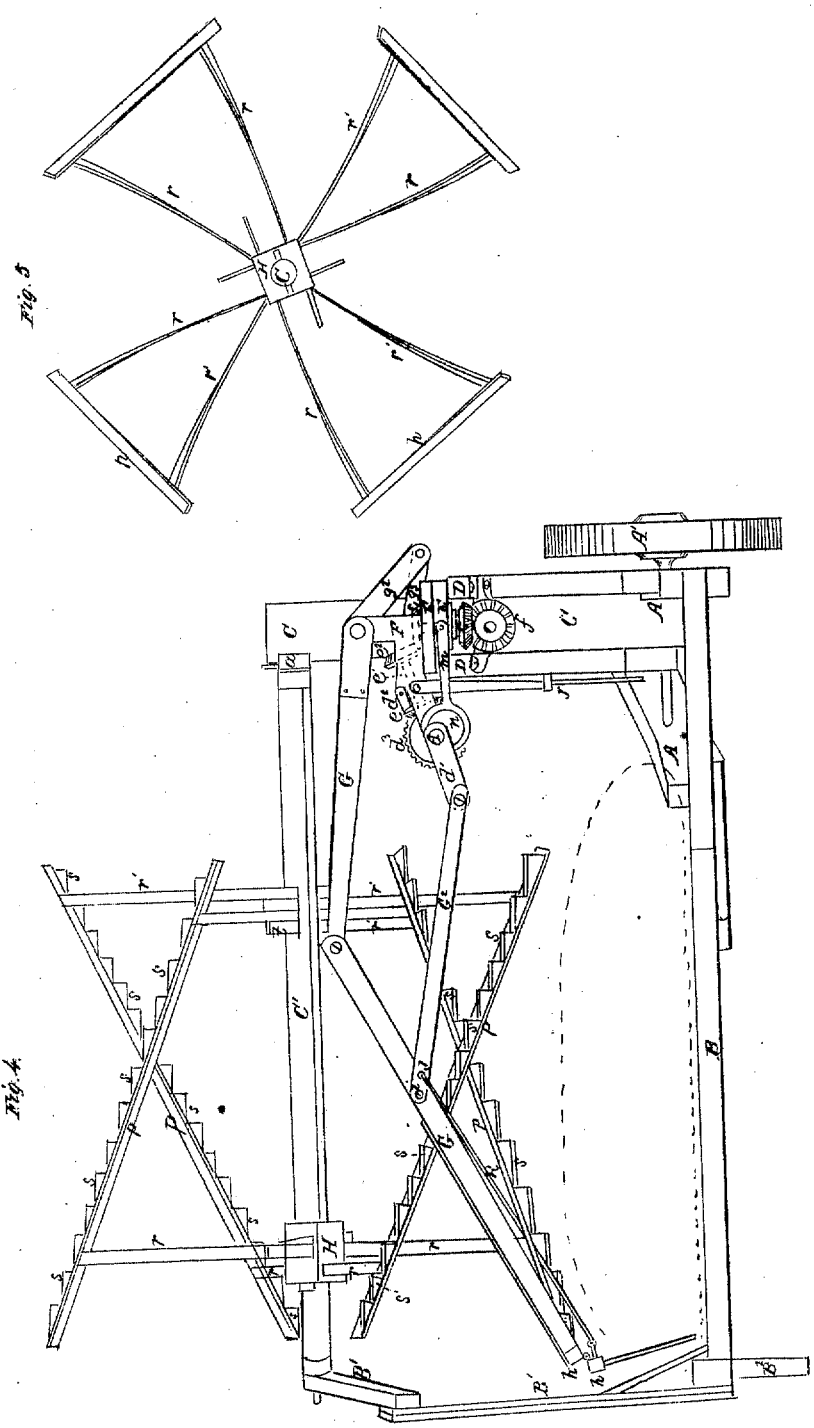

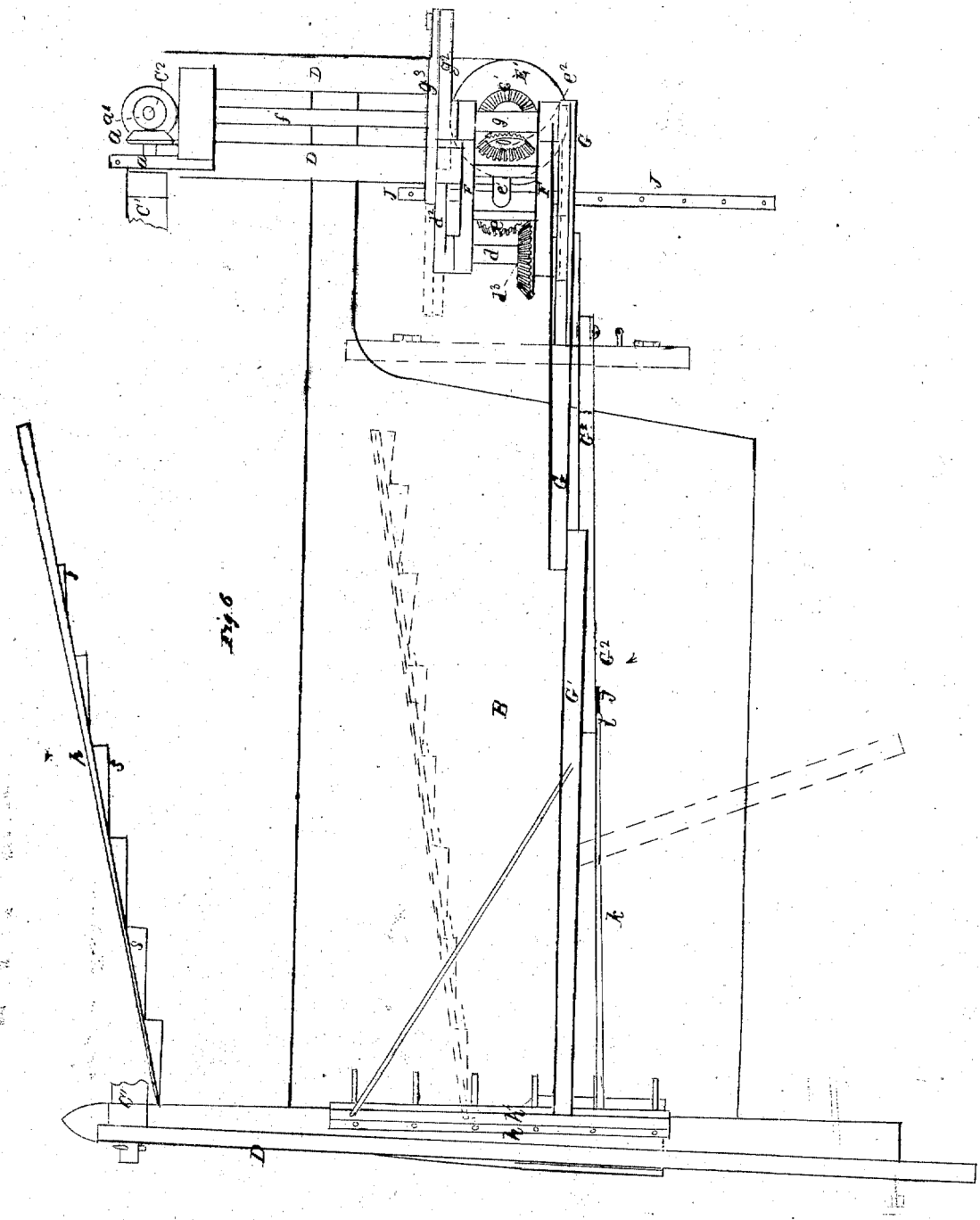

ISAAC S. RUSSELL AND HENRY R. RUSSELL, OF NEW MARKET, MARYLAND, AND JOHN I. D. BRISTOL, OF DETROIT, MICHIGAN, ASSIGNORS TO ISAAC S. RUSSELL AND HENRY R. RUSSELL.

IMPROVEMENT IN RAKING ATTACHMENTS TO HARVESTERS.

Specification forming part of Letters Patent No. 39,329, dated July 21, 1863.

*To all whom it may concern:*

Be it known that we, ISAAC S. RUSSELL and HENRY R. RUSSELL, of New Market, in the county of Frederick and State of Maryland, and JOHN I. D. BRISTOL, of Detroit, in the county of Wayne and State of Michigan, have invented a new and Improved Automatic Raker for Harvesting-Machines; and we do hereby declare that the following is a full, clear, and exact description thereof, reference being had to the accompanying drawings, making a part of this specification, in which—

Figure 1, Sheet 1, is a perspective view of our invention, taken from the rear of the machine. Fig. 2, Sheet 2, is a side elevation of the improved raker. Fig. 3 is a plan view of Fig. 2, with the outer end portion of the frame broken away. Fig. 4, Sheet 3, is a rear end elevation of the machine complete, representing the rake in its two extreme positions. Fig. 5 is an end view of the reel and a section through the reel-shaft. Fig. 6, Sheet 4, is a plan view representing the rake in its two extreme positions and the relative positions of one of the reel-ribs therewith.

Similar letters of reference indicate corresponding parts in the several figures.

This invention relates to certain new and useful improvements in machinery to be applied to harvesting-machines for raking grass or grain from the platforms thereof and delivering the same in gavels at one side of the machine, said machinery being adapted to work automatically and to operate in such a relation with a spiral reel for gathering in the standing grain that the rake, in each collecting-sweep across the platform, may be at nearly the same distance from the gathering-rib of the reel during the full horizontal stroke or travel of the rake.

It consists in a novel combination of mechanical devices for operating the rake and giving to it a curved motion, both backward and upward, in its retrograde movement, and a movement nearly parallel with the platform across the platform, at right angles to the line of draft, in its collecting-stroke, all as will be hereinafter described.

It also consists in so articulating the rake-head and connecting it to the extension-arms which support it that the teeth of the rake will preserve nearly a perpendicular position with relation to the platform during the full collecting-stroke, as will be hereinafter described.

It also consists in an adjustable spirally-ribbed reel, in combination with a side-delivery rake, operated as will be hereinafter shown, said reel and rake having a harmonious movement and operating in such a relation to each other that an equal distance between the rake and one of the ribs of the reel may be preserved during the full collecting-sweep of the latter over the platform, thus preventing any of the cut grass or grain from falling over or on the rake, as will be hereinafter described.

It also consists in so constructing the reel that its ribs or wings may be adjusted in any spiral or oblique curve which it may be found desirable to set them, as will be hereinafter described.

It also consists in so constructing a reel as to combine with the spiral or oblique ribs the advantages of the straight ribs for gathering in the grain while it is being cut without impairing the effectiveness of either, as will be hereinafter described.

It finally consists in mounting the rake-arms, rake, and the mechanism for operating the same upon two horizontal oscillating disks which are supported in rear of the driving-wheel frame, as will be hereinafter described.

To enable others skilled in the art to make and use our invention, we will proceed to describe its construction and operation.

In the accompanying drawings, A represents the main supporting-frame, and A' is the driving-wheel upon which this frame A is supported.

B is the platform upon which the grain as it is cut falls, and B' is the outer skeleton reel-frame, which together with the platform B is mounted on the outer supporting-wheel, B². The platform proper is between the inner and outer frames, and this leaves a space behind the driving-wheel frame for allowing the cut grain to be raked off the platform and deposited on the ground at this point.

C is an upright post, which is rigidly connected to the driving-wheel frame A, and in a bracket, *a*, projecting forward from this post the inner end of the reel-shaft C' has its bearings. The outer end of reel-shaft C' has its bearings in the projecting beam of the frame B', and this reel-shaft is rotated in the direction indicated by the arrows in the drawings by means of a bevel-wheel, $a'$, which engages with a bevel-wheel, $a^2$, on the vertical driving-shaft $C^2$, as shown in Figs. 1 and 2 of the drawings. This shaft $C^2$ has its bearings in projections on the post C, and shaft $C^2$ is driven by means of the twin bevel-wheels $b\ b'$, the latter one of which is keyed on the axle of the main driving-wheel A', as indicated in dotted lines, Fig. 2.

D D are two beams, which are parallel to each other, and which incline forward, extending some distance behind the main frame A, to which they are rigidly framed. These parallel beams are used for supporting the rake and the machinery which gives it motion. They also serve as braces for and are sustained in turn by the upright post C. The beams D D carry on their outer ends two horizontal circular plates, E E', the lower one, E, of which is fixed rigidly to these arms, and the upper one, E', is allowed to oscillate about a central pinion-shaft, $c$, which passes up through the axes of these disks E E', and carries on its ends bevel-wheels $c'\ c^2$, as shown in Fig. 4. The upper disk, E', supports a frame, F F, which consists of two upright standards and two inclined arms, which latter form a bracket that overhangs the disks E E'. This frame is rigidly connected to or it may form a part of the oscillating disk E, and on the lower end of the inclined arms of frame F a transverse crank-shaft, $d$, has its bearings, which shaft carries on one end a crank, $d'$, and on the other end a crank, $d^2$, both of which cranks are nearly in the same place. This shaft $d$ also carries a large bevel spur-wheel, $d^3$, which engages with a bevel-wheel, $e$, that is keyed to an inclined shaft, $e'$, carrying on its opposite end a bevel-wheel, $e^2$, which engages with the bevel-wheel $c^2$. The lower bevel-wheel, $c'$, engages with a corresponding wheel, $f$, which is on the rear end of a horizontal transverse shaft, $f$, that carries on its forward end a bevel-pinion, $f^2$, which engages with a corresponding pinion, $g'$, keyed to the vertical driving-shaft, $C^2$. This train of wheel-work is the medium through which motion is communicated to the shafts $d\ g$, which carry the cranks and connecting-rods supporting the rake. The transverse shaft $g$ carries on one end a vibrating crank, $g^2$, which is connected to the crank $d'$ by means of pitman $g^3$, and on the opposite end of shaft $g$ a long vibrating arm, G, is fixed, to the extreme outer end of which the upper end of the rake-handle G' is pivoted. This rake-handle is connected to the crank $d'$ by means of the rod $G^2$, which is pivoted to this handle G at $i$. (Shown clearly in Figs. 1 and 4.)

The rake-head $h$ is hinged to a horizontal T-head, $h'$, on the end of handle G, and this rake-head $h$ is connected at $j$ to the pivoted rod $G^2$ by a stay-rod, $k$, which keeps the teeth of the rake in nearly a perpendicular position to the platform during the collecting-sweep of the rake-head across it. Thus it will be seen that the rod $k$ serves as a stay for the hinged rake and keeps the teeth nearly if not quite perpendicular to the platform.

The crank-shaft $d$ is connected to the lower or stationary disk, E, by means of a rod, $m$, which has a yoke on one end encompassing an eccentric, $n$, which is keyed to the shaft $d$ and turns with it. As this shaft $d$ is rotated, the rod $m$ being pivoted to the stationary disk E, the eccentric will give a regular oscillating movement to the disk E' and its frame F, together with the rake and the connecting-rods attached thereto, and this movement is so timed with relation to the rake movement that the rake will be thrust backward and upward in the retrograde movement, describing a curve, which carries the rake to the outer end of the platform, in a position for making its rectilinear collecting-sweep across the platform. The rake will by these means be returned each time to the outer end of the platform without acting upon the cut product thereon. The oscillating movement which the eccentric $n$ gives to the disk E' and its appendages does not in any manner interfere with the perfect operation of the train of wheel-work through which motion is communicated to the several parts from the main driving-wheel shaft, for the shaft connecting the two disks, E E', together, and about which the upper disk, E', oscillates, is loose, and serves as a means for transmitting the rotary motion of the horizontal driving-shaft $f'$ to the inclined shaft $e'$, besides being the axis for the upper disk, as above shown. The oscillating movement of the disk is only intended to cause the rake to clear the cut grain which is on the platform, and also the ribs or wings of the reel, in the retrograde movement of this rake, and independently of this movement the rake-head is moved in a curve which we have represented in red lines, Fig. 4.

The second part of our invention relates to the reel used for gathering in the standing crop, to the work of cutting it, and then depositing the cut product on the platform.

The reel consists of four or more ribs, $p\ p$, which are made of any suitable flexible wood or other substance, and connected to the outer ends of radial arms $r\ r\ r'\ r''$, the ends of which latter pass through mortises made through the reel-shaft C', and are keyed in place by the wedges $t\ t$, while the ends of the former, $r\ r$, pass through a square hub, H, which is allowed to rotate on the reel-shaft C', and which is fixed to this shaft by a key or other suitable device. When this hub H is loosened and turned partially round on the shaft C' the ribs $p\ p\ p\ p$ will be twisted into a spiral form around this shaft, and this twist may be increased or diminished at pleasure. When this adjustment is effected and the desired obliquity given to the ribs $p$ the block H is keyed fast and the reel will present the form shown in the drawings, Figs. 1, 2, 3, and 5.

In Fig. 4 we have shown an improvement applied to a spiral reel, which consists in furnishing one side of each spiral rib (that side which impinges upon the standing crop) with a series of serrations, $s\ s$, extending from end to end of the ribs. The inclined surfaces or edges of these serrations are in planes parallel, or nearly so, to the reel-shaft, and also to the front edge of the platform, as shown in Figs. 4 and 6. The object of these serrations or serrated ribs or parallel surfaces on a spirally-ribbed reel is to press the standing grain or grass over the platform, and to produce the same result as the straight or parallel ribbed reel.

It will be seen that the spiral ribs alone would not press the standing grain over and on the platform properly, but to one side thereof and toward the draft-frame A; but by applying the serrated surfaces to the reel-ribs we obtain a succession of parallel surfaces which press the grain uniformly on the platform.

From the above description it will be seen that both the reel and the rake receive their motion from one shaft, $C^2$, and thus it is very easy to time the relative speed of these two movements so that they will operate conjointly to press or spread the cut product on the platform and to rake it therefrom. This being the case, the speed which it is desired to give the rake in its advancing and receding motions is first determined. Then by adjusting the reel-ribs and regulating the speed of the reel to conform to these motions, the operation will be as follows: As the rake commences its travel across the platform in its collecting-stroke the outer end of one of the reel-ribs approaches the rake and commences its operation upon the standing crop, spreading the cut product on the platform in front of the rake; and as each successive surface $s$ is brought into action the reel advances, so that during the entire stroke of the rake across the platform the operating portions of the rib remain at nearly the same distance from the rake-head and deliver the product on the platform as rapidly as the rake moves. This novel operation of the reel is effected by giving to the reel-ribs such an obliquity with reference to the reel-shaft and the rectilinear path of the rake across the platform that, while the acting surfaces $s$ of the reel continually press the cut product in front of the rake, they will never overtake it, but preserve nearly a uniform distance from the rake during its full collecting-stroke. The rake itself receives a vibrating motion independently of that given to it by the cranks and arms described; and this motion of the rake keeps its teeth nearly perpendicular to the platform during its collecting-travel, so that when the rake delivers its gavel, these teeth being nearly perpendicular, as above stated, they will readily discharge their entire load and deposit it uniformly in rear of the machine. The fender or apron J which we have shown in the drawings is intended for preventing the rake from scattering the cut product in delivering the same from the side of the platform.

By supporting the rake in rear of the draft-frame A and on one side of the platform B, as above described, we obtain the advantages of giving a direct and positive movement to the rake, also of rendering the mechanism which operates the rake more compact, and, finally, of obtaining a side delivery.

It will be seen that we dispense with all slotted arms and perform the whole operation by means of common cranks, connecting-rods, and an eccentric, which are less liable to derangement and clogging than slotted arms, cranks, &c., which have hitherto been used.

Having thus described our invention, what we claim as new, and desire to secure by Letters Patent, is—

1. Giving to the rake a motion nearly parallel with the platform in its delivery-passage over it, and also a motion in a curve both upward and backward in its return-stroke, by means of the cranks and arms $G\ d'\ d^2\ g^2$, eccentric $n$, pitman $m$, and connecting-rods $g^3$ and $G^2$, all of which are unslotted.

2. The interposition of the thrusting eccentric $n$ or its equivalent, for giving to the rake an oscillating motion for the purpose described.

3. The articulated rake-head or hinged teeth, so applied to the rake-handle and to the intermediate controlling-bar, $k$, or its equivalent, that the teeth will preserve a position nearly or quite perpendicular to the platform.

4. The combination, with a rake which sweeps the platform, of the flexible reel-ribs supported at or near both ends by flexible radial arms, one set of which are affixed to the reel-shaft and the other set affixed to a circularly-adjustable hub, substantially as and for the purposes set forth.

5. The serrated spirally-ribbed reel, in combination with a rake which sweeps the platform, substantially as described.

6. Making the axis of the oscillating frame F a medium through which motion is communicated from the driving-wheel shaft to the rake, disk E being the bearing for said frame, substantially as described.

ISAAC S. RUSSELL.
     HENRY R. RUSSELL.
     JNO. I. D. BRISTOL.

Witnesses as to signatures of Isaac S. Russell and Henry R. Russell:
 WILLIAM W. OGBORN,
 ELIAS MOUNT.

Witnesses as to signature of John I. D. Bristol:
 B. T. PRENTIS,
 ALEX. M. BRISTOL.